March 29, 1932. F. H. GIBBS 1,851,700
CLUTCH DRUM
Original Filed May 6, 1927
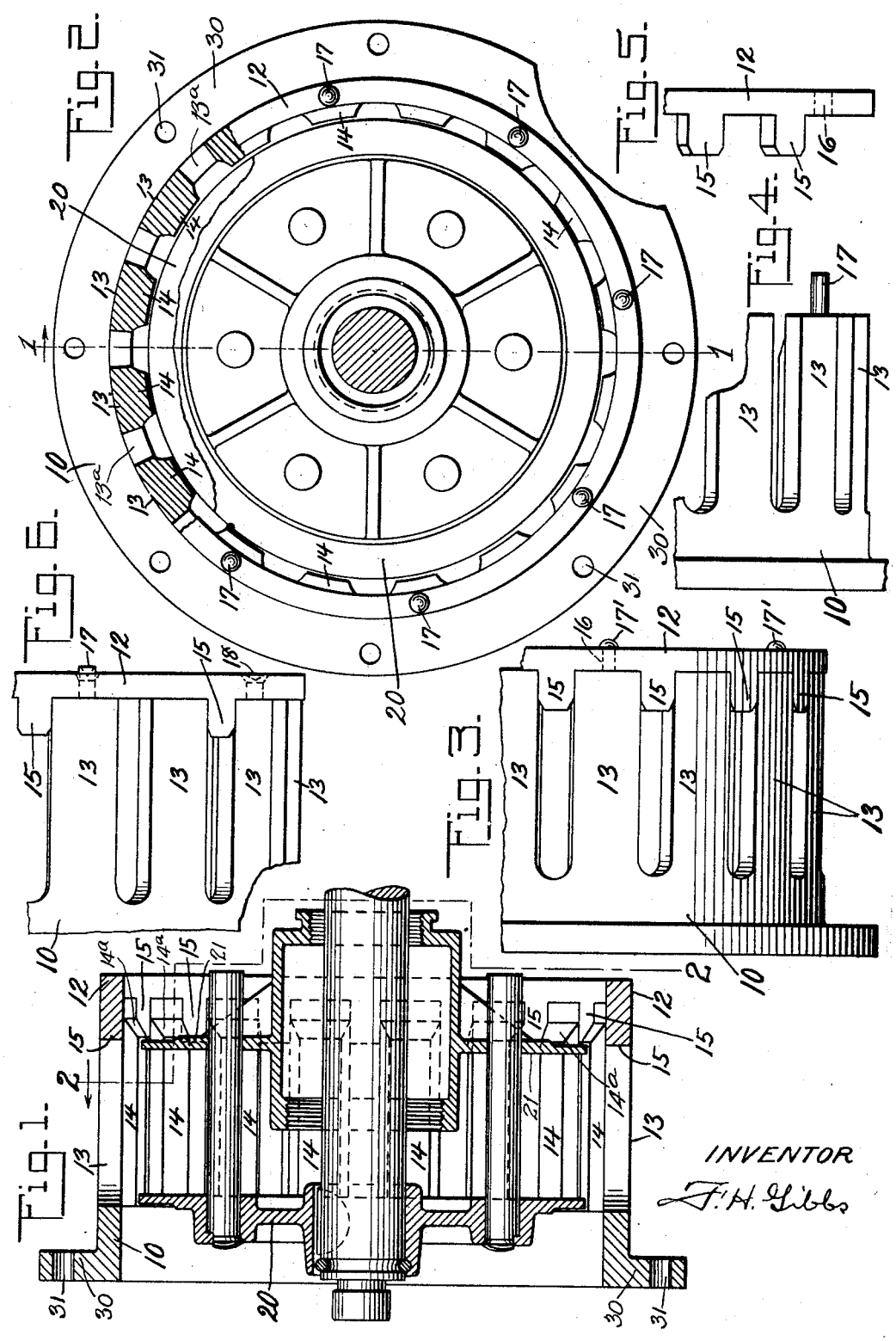
INVENTOR
F. H. Gibbs Patented Mar. 29, 1932

1,851,700

UNITED STATES PATENT OFFICE

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY

CLUTCH DRUM

Application filed May 6, 1927, Serial No. 189,366. Renewed April 28, 1931.

My invention relates to power transmission clutches, and more particularly to a clutch drum. An object of the invention is to provide a clutch drum embodying a plurality of sections which may be cast separately and subsequently assembled by a single longitudinal movement to form the completed drum, after which the parts can be secured together without extraneous securing devices, thereby forming a clutch drum of two simple cast parts nested together for mutual reinforcement.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a vertical sectional view of a clutch embodying my improved clutch drum, the section being taken on line 1—1 of Fig. 2;

Fig. 2 is a vertical transverse sectional view on line 2—2 of Fig. 1, having parts broken away;

Fig. 3 is a fragmentary top plan view of the clutch drum;

Fig. 4 is a fragmentary elevation of one member of the drum; and

Fig. 5 is a similar view of the other member of the friction clutch drum, and

Fig. 6 is a fragmentary detail of the drum assembly showing a modified form of securing means for the annulus.

Referring now more in detail to the drawings, the clutch drum of the present invention is formed from a main clutch section 10 and a co-acting section 12 in the form of a flat ring or annulus. The drum section 10 is cylindrical in form and is provided with open ends and an attaching annular flange 30 perforated at 31 for receiving securing bolts whereby the clutch drum may be attached to a power transmitting element such as a flywheel (not shown). Except for the clutch drum section 10 and its attaching flange 30 and the annulus 12, no claim is made to the details of construction or operation of a clutch per se. The drum section 10 is preferably formed as a die casting with a plurality of circumferentially spaced segments or longitudinal fingers 13, and each of these segments or fingers is formed in casting with an integral longitudinal tooth or rib 14 upon its inner face for coaction with intermeshing teeth or bars on friction discs common to such clutches, and the ends of said teeth 14 are unobstructed and may be tapered as shown clearly at 14a.

The annulus 12 is of about the same thickness as the walls of the drum section 10 and is preferably formed as a die casting with a plurality of laterally extending spaced fingers or ribs 15. As shown particularly in Figures 3 and 6, the annulus 12 is placed against the outer edge of the drum section 10 with its fingers 15 and the fingers 13 overlapping and preferably with a finger or rib 15 between each pair of fingers or ribs 13 so as to materially reinforce the interfitting ends of the fingers 13 in service. Spaced openings 16 are provided in the annulus 12 for the reception of integral extensions 17 on the ribs 13 which extend through the openings 16 and are provided with dished end portions which can be upset as shown at 17' or 18 to secure the drum sections together. It will be observed that the annulus and its fingers interfitting with the fingers or ribs 13 lend rigidity to the latter permitting them to withstand the necessary torque when in use, and that the drum section 10 with the segments 13 and longitudinal teeth 14 may be cast with comparative ease, due to the fact that it is open at one end and can be readily drawn from the mould.

It is old in the art to form a clutch drum of a usual type casting and no claim is being made to such a broad concept. These cast drums present several disadvantages which are eliminated by the drum of the present invention. In forming the usual cast clutch drum, a cylindrical casting is first made, then internal teeth must of necessity be cut therein by a suitable gear cutting machine, and following this operation it is necessary to place the casting in a lathe or other suitable machine to remove a certain amount of the metal to provide openings to permit ventilation, as the fibre discs forming a part of the completed clutch structure and which are retained in the drum become abnormally hot in service. It is a well-known fact, proven by manufacturers of such cast clutch drums, that the various steps necessary for fabricating the usual cast clutch drum as outlined above, subject the metal of the casting to severe internal stresses which set up minute fractures and such castings are deficient. The cutting by gear cutting machine and the formation of the ventilated openings often results in fracturing the castings so that a large number thereof are incapable of use and must be discarded. The present invention aims to and does eliminate the disadvantages present in the usual cast clutch drum by providing a main clutch drum section formed of a die casting having spaced fingers or segments projecting axially from an annular portion and provided with longitudinally extending teeth. This section is indicated in the drawings at 10 and it is formed as a single unit which, when it is removed from the die is susceptible of use as a clutch drum without any machining operation. The spaces between the fingers which project axially from the annular portion of the drum section 10 define openings for ventilating purposes. It has been found advisable in view of service conditions to stiffen the drum section 10 against torsional strains in addition to the inherent stiffening properties of the longitudinally extending teeth 14 formed on the fingers or segments, and to that end, use is made of an annulus 12 arranged at the ends of the fingers or segments 13 and connected thereto, which annulus is provided with axially extending fingers 15 which enter the spaces between the fingers 13 and are interfitted between said fingers; the projections 15 closing the open ends of the spaces between adjacent fingers 13 as shown in Fig. 3, and the annulus 12 with its fingers or projections 15 serving obviously to stiffen the drum section 10 against torsional strains. The annulus 12 may also be a die casting if desired, but this is not essential, as this element or portion of the complete drum structure is not subjected to machining operations such as would fracture the metal. In practice it may be desirable to form the annulus 12 and its projections 15 of a die casting. This invention, therefore, comprises a construction which includes a die cast member consisting of an annular portion from which spaced fingers project, the fingers carrying longitudinally arranged teeth and the spaces between said fingers defining a means for ventilating the drum. The invention also includes the structure just described with means such as a drum part consisting of an annulus having spaced elements projecting axially therefrom which interfit with the fingers of the above-mentioned die cast member whereby said die cast member is stiffened against torsional strains. This construction is in contradistinction to a cylindrical clutch drum having a plurality of spaced depressions arranged therein and formed in the material of the drum, which depressions define on the interior of the drum a plurality of projections which extend radially inward and which are longitudinally arranged with respect to the drum.

As before mentioned herein, no claim is made to the details of construction or the operation of the clutch, aside from the clutch-drum 10 with its attaching flange 30 and the annulus 12, but it is to be understood that the clutch has associated therewith the usual fixed end plate and a movable end plate or pressure plate which are clearly shown in Fig. 1.

As illustrated in Fig. 1, 20 is the fixed end plate and 21 the movable end plate or pressure plate between which it is intended to interpose the conventional metal and fiber clutch disks provided with teeth adapted to ride in the spaces between teeth 14 and with spaces therein adapted to receive such teeth, thereby connecting the driving and driven parts of the clutch in service.

To permit the use of such disks, the teeth 14 project into the drum and terminate in the unobstructed end portions 14$^a$ as illustrated in Fig. 1 in which the annulus 12 is shown in section positioned so as not to interfere with the entire freedom of movement of clutch disks into service position without diassembling the clutch drum structure for that purpose.

Thus the unobstructed inner ends of the teeth 14 permit axially extending projections 15 to pass between them in the spaces 13$^a$, practically filling the outer portion of such spaces and reinforcing the segments without obstructing the teeth 14.

What is claimed is:

1. A clutch drum comprising a main drum section having a plurality of slots therein to define longitudinal tooth segments, and means for reinforcing said tooth segments against torsional strain comprising an annulus secured to the end portions of the segments exteriorly of the main drum section, said annulus being of substantially the same diameter as the main drum section and being provided with axial teeth arranged in the ends of the slots between adjacent segments and of a size to closely engage the side edges of the segment ends.

2. In a clutch drum, a main drum section comprising connected spaced segments, teeth on the inner faces of some of such segments, a reinforcing annulus connected with the end portions of some of said segments in such position as to leave the ends of said teeth unobstructed and having rigid extensions thereon adapted to extend between the outer portions of some of said segments to brace the same against torsional strains.

3. In a clutch, a drum section having a plurality of circumferentially spaced segments connected at one end and spaced apart at their opposite ends, longitudinal teeth on the inner faces of some of said segments, and an annulus secured to the end portions of some of said segments and extending between the outer portions of some of said segments in such positions as to leave unobstructed the ends of said teeth.

4. A clutch-drum comprising a main annular member having slots therein defining tooth portions, and means for reinforcing the tooth portions against torsional strain comprising a member rigidly secured to the end of said main member and having axial extensions arranged to project into the slots of the main member.

5. A clutch-drum formed from two complementary rigidly connected parts, one of which is slotted axially and the other of which is provided with integral projections fitting said slots, there being radially projecting teeth on the slotted member unobstructed when the parts are in connected relation.

6. A clutch-drum comprising a radially toothed and slotted member and an annular end member radially connected thereto and having axially extending projections interfitting with the slots of the first member to reinforce the toothed portion of the first named member against torsional strain.

7. In a clutch drum, an annulus having axially projecting spaced fingers, and means for reinforcing the fingers against twisting under torque load comprising an annulus arranged at the ends of said fingers and provided with axial projections arranged between and fitted against the sides of said fingers.

8. A clutch drum formed of a die casting comprising a pair of annuli having interfitting axially projecting fingers.

9. In a clutch drum, a main section comprising a die cast annulus having axially projecting fingers, and an annulus secured at the ends of said fingers provided with axial projections fitted between said fingers for reinforcing the latter under torque load.

10. A clutch drum formed of a pair of cooperating parts each provided with an annular portion and fingers projecting axially therefrom, at least one of said parts being a die casting.

11. A clutch drum formed of a pair of cooperating die cast members, each comprising an annulus having spaced fingers projecting axially therefrom, the fingers of the respective members being interfitted to define a unitary structure having a plurality of longitudinally extending ventilating openings intermediate the annuli.

12. A clutch drum formed of a pair of cooperating die cast members, each comprising an annulus having spaced fingers projecting axially therefrom and one of said members having longitudinally extending teeth formed on said fingers, the fingers of the members being interfitted to define a unitary structure having a plurality of ventilating openings intermediate the annuli.

13. In a clutch drum, a main drum section comprising a die cast member including an annular portion having a plurality of longitudinally toothed spaced segments projecting axially therefrom, and means for stiffening said segments against torsional strain comprising an annulus secured to the main drum section adjacent the free ends of said segments and provided with fingers projecting therefrom and fitted between the said segments at the end portions of the latter.

14. A clutch drum formed from two cooperating parts, each comprising an annulus having fingers projecting axially therefrom, the fingers of one part being interfitted between pairs of fingers of the other part to stiffen the drum against torsional strain and to define a plurality of longitudinally extending ventilating openings intermediate the annuli.

15. In a clutch drum, a main drum section comprising a die cast annulus having spaced fingers projecting axially therefrom, and longitudinally arranged teeth formed on the under surfaces of said fingers, and means for stiffening the main drum section against torsional strain comprising a member secured to the main drum section at the ends of the fingers and provided with projections extending axially therefrom fitting between spaced fingers of said main drum section.

16. A clutch drum including a main drum section comprising a cylinder having slots in one end thereof forming fingers, and longitudinally arranged teeth on the inner surfaces of said fingers and integral therewith, said cylinder having a radially extending flange for securing the latter to a power transmitting element.

17. A clutch drum including a main drum section comprising a die cast cylinder having axial slots in one end thereof and extending substantially the length of the cylinder forming fingers, and longitudinally arranged teeth on the inner surfaces of said fingers, and a flange at the other end having a greater diameter than said cylinder for securing the latter to a power transmitting element.

18. A clutch drum including a main drum section comprising a cylinder having an outwardly extending, vertical flange on one end thereof and axial slots in the other end thereof forming fingers, and longitudinally arranged teeth on the inner surfaces of said fingers and integral therewith.

In witness whereof I have hereunto set my hand.

FREDERICK H. GIBBS.